United States Patent [19]

Sowell

[11] 4,137,793
[45] Feb. 6, 1979

[54] THROTTLE CONTROL DEVICE FOR MOTORCYCLES AND THE LIKE

[76] Inventor: William E. Sowell, 2424 Hanford Rd. SW., Atlanta, Ga. 30315

[21] Appl. No.: 831,761

[22] Filed: Sep. 9, 1977

[51] Int. Cl.² .................. G05G 1/08; F16D 49/10
[52] U.S. Cl. ........................................ 74/488; 24/270; 24/273; 74/531; 188/77 R
[58] Field of Search .............. 74/488, 489, 531; 188/77 R; 24/270, 273

[56] References Cited

U.S. PATENT DOCUMENTS

| 752,881 | 2/1904 | Ball | 188/77 R |
|---|---|---|---|
| 1,110,011 | 9/1914 | Schneider | 24/270 |
| 1,473,326 | 11/1923 | Slawienski | 74/489 |
| 2,776,579 | 1/1957 | Nichel, Jr. | 74/488 |
| 3,982,446 | 9/1976 | Dyken | 74/488 |
| 4,060,008 | 11/1977 | Wilkinson | 74/488 |

Primary Examiner—Allan D. Herrmann
Attorney, Agent, or Firm—James B. Middleton

[57] ABSTRACT

A throttle control device for use with a spring-return throttle wherein a rotatable sleeve on a handlebar must be rotated to advance the throttle, the throttle control device including a clamping arrangement receivable over the rotatable sleeve to be just forward of a handgrip normally received over the sleeve, the clamping arrangement having a tab that engages conventional equipment to prevent rotation of the clamping means, and including a lever operated cam for clamping the sleeve to hold the throttle in a pre-set position, the clamping arrangement being held in position by the handgrip.

6 Claims, 5 Drawing Figures

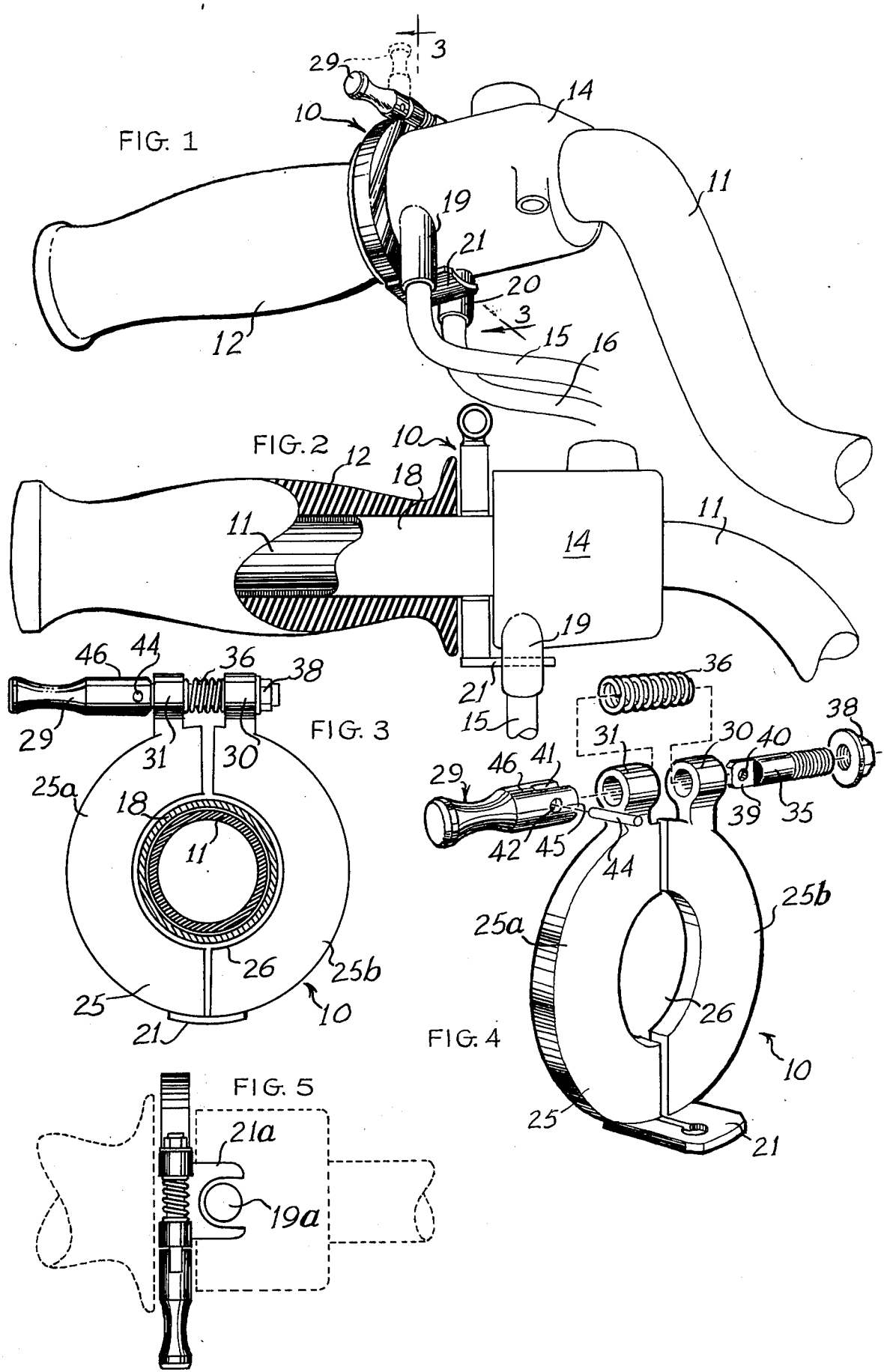

THROTTLE CONTROL DEVICE FOR MOTORCYCLES AND THE LIKE

This invention relates to throttle control devices, and is more particularly concerned with a cruise control device for use in conjunction with returned-biased throttles, such as are used on motorcycles and the like.

In numerous vehicles of the type having handlebars, as opposed to a wheel for steering, the throttle is located at the end of the handlebars and is arranged to be operated by rotation of the grip at the extending end of the handlebar. As in most motorized vehicles, the throttle is equipped with a spring return so that when the throttle is released, the engine automatically returns to idle speed.

While the spring-return throttle is quite desirable in most cases both to minimize the effort required and to achieve maximum safety, there are occasions on which it is desirable to have the throttle remain in a substantially fixed position. These occasions are primarily during long trips wherein a given speed is sustained for an extended period of time. During such trips, one's hand becomes quite fatigued from continously holding the throttle in a fixed position without being able to rest one's hand occasionally. It will be understood that one cannot switch hands on the throttle because the operator's left hand is too far from the throttle to operate the throttle with safety.

In the past, there have been numerous devices that attempted to solve the above stated problem. One form of prior art device includes a spring to bias the throttle towards the "on" position, thereby counteracting, or partially counteracting, the throttle spring which attempts to return the throttle to the idle position. This type of device has been utilized in many forms. One form is as a home-made apparatus wherein a spring is inserted and wound to some arbitrary extent, then pinned in place within the handlebar. Other forms have included devices manufactured commercially with various degrees of engineering to improve the operation of the device. In all cases, however, the counteracting spring must: (1) simply reduce the amount of effort required to advance the throttle, (2) balance the throttle spring so that the throttle will stay in any given position, or (3) overcome the throttle spring to the extent that the throttle will automatically advance. In the first case, the problem has been only partially solved, since one must still maintain his grip on the throttle in order to maintain a given speed. In the second case, the advantages of a spring-return throttle are completely done away with so that one must use effort to advance the throttle, then must use effort to return the throttle. The last case is one that would ordinarily be achieved by error only, since it would normally be considered hazardous to have the throttle to advance automatically. Another variety of cruise control is the type wherein some clamping means engages some portion of the throttle advancing apparatus and holds the throttle apparatus in a pre-set position, With this form of apparatus, the throttle would be placed at the desired position, then the cruise control device would be engaged to retain that position. This type of device has usually been cumbersome and unwieldy because of the necessity to hold a clamping means stationary with respect to the handlebar but to have the clamping means in position to engage the handlebar grip.

The present invention overcomes the above mentioned and other difficulties with the prior art cruise control devices by providing a throttle control device comprising a clamping means receivable over the rotatable sleeve by which the throttle can be advanced, the clamping means being located forward of, and substantially contiguous with, the hand grip. The clamping means includes a tab for engaging conventional equipment on the handlebar to prevent rotation of the clamping means with respect to the handlebar; and, the clamping means includes means for urging the clamp members apart to release the throttle advance means, and cam means for urging the clamp members towards each other to engage the throttle advance means. The cam means is preferably designed so that a positive motion by the operator is required to engage the clamping means, and a very simple motion is required to disengage the clamping means. Furthermore, the apparatus of the present invention is such that the cruise control device can be manually overridden for increasing or decreasing acceleration without releasing or otherwise changing the cruise control device.

These and other features and advantages of the present invention will become apparent from consideration of the following specification when taken in conjunction with the accompanying drawing in which:

FIG. 1 is a perspective view showing one embodiment of the present invention installed on a conventional handlebar for a motorcycle or the like;

FIG. 2 is a side elavational view of the apparatus shown in FIG. 1, portions thereof being shown in cross-section to show the construction of the device;

FIG. 3 is a cross-sectional view taken substantially along the line 3—3 in FIG. 1 of the drawing;

FIG. 4 is an exploded perspective view of the cruise control device of the present invention as shown in FIGS. 1, 2 and 3 of the drawing; and, FIG. 5 is a top plan view of a modified form of the invention, portions of the handlebar being shown in phantom.

Referring now and more particularly to the drawing and to those embodiments of the invention here chosen by way of illustration, it will be seen that the cruise control device is generally designated at 10, and is here shown as being installed on a conventional handlebar 11 having a handlebar grip 12 at one end of the handlebar 11. The assembly further includes a housing 14 which contains conventional apparatus whereby the rotary motion of the grip 12 is converted into a linear motion to move cables within the tubes 15 and 16. Such apparatus is conventional and is well understood by those skilled in the art. The details are therefore not shown herein.

It will be observed in FIG. 1 of the drawing that the cruise control 10 is located between the hand grip 12 and the housing 14 which places the device 10 contiguous with the hand grip 12 to be in easy reach of a person's thumb or forefinger.

Looking at FIG. 2 of the drawing, it will be seen that the handlebar 11 extends through the above described apparatus so that the hand grip 12 surrounds the extending end of the handlebar 11. In order to operate the cable or other means within the tubes 15 and 16, there is conventionally a rotatable sleeve 18 which covers the end of handlebar 11, and which receives the hand grip 12. As a result, it will be seen that, on rotation of the hand grip 12, the sleeve 18 is rotated while the handlebar 11 remains stationary. The housing 14 is fixed to the handlebar 11 and the housing 14 is stationary with respect to the handlebar 11.

As best seen in FIGS. 1 and 2 of the drawing, the tubes 15 and 16 extend from fittings 19 and 20, the fittings 19 and 20 being integrally formed with the housing 14, and extending therefrom. The fittings 19 and 20 are normally slightly spaced apart as shown in FIG. 1.

It will now be understood that the cruise control device 10 of the present invention is received over the sleeve 18; and, the control device 10 includes an anchoring means 21 which extends forwardly to be held between the fittings 19 and 20. As a result, the control device 10 is held stationary relative to the handlebar 11 and surrounds the rotatable sleeve 18.

Looking now at FIGS. 3 and 4 of the drawing for a better understanding of the construction of the control device 10, it will be seen that the device includes a disk 25 having a central aperture 26. The disk 25 is split so that the disk is divided into a plurality of sections, the plurality of sections being movable away from one another to enlarge the aperture 26, and movable towards one another to reduce the size of the aperture 26.

Mounted on the circumference of the disk 25, there is a constriction means 28 for urging the plurality of sections of the disk 25 towards one another, the constriction means 28 being operable by a lever 29.

In more detail, it will be seen that the embodiment of the invention here chosen by way of illustration includes two sections of the disk, the sections being indicated at 25a and 25b. The split in the disk 25 which separates the disk into the two sections 25a and 25b is here shown as extending vertically so that the disk 25 is divided into a left and right segment, the segment 25a being the right-hand segment and the segment 25b being the left-hand segment. It should be understood that left and right as here designated is as viewed by a person riding a motorcycle or the like.

The anchoring means 21 comprises a tab fixed to the circumference of the disk 25, the tab 21 spanning the lowermost split in the disk 25. The tab 21 is fixed to both the section 25a and the section 25b so that the tab 21 serves to hold the two sections together. It will be understood that the tab 21 is sufficiently bendable to allow the necessary motion of the sections of the disk 25. Alternatively, it will be understood that the tab 21 could be the extending portion of a bracket which is pivotally fixed to the section of the disk 25, the object being to allow the various sections of the disk 25 to move relative to one another.

Looking now at the constriction means 28, it will be seen that the disk 25 has a pair of ears 30 and 31 fixed thereto, the ear 30 being fixed to the section 25a of the disk 25 and the ear 31 being fixed to the section 25b of the disk 25. The ears 30 and 31 are provided with axially aligned bores 32 and 34 respectively. The bores 32 and 34 receive therethrough a stud 35, the stud 35 having a spring 36 surrounding the stud 35 between the ears 30 and 31. It will be understood that the spring 36 is of sufficient diameter to remain between the ears 30 and 31 so that the spring 36 tends to urge the ears 30 and 31 apart, thereby urging the sections 25a and 25b of the disk 25 apart.

One end of the stud 35 receives a nut 38 to hold the stud in place, while the opposite end of the stud 35 is provided with a tongue 39 having a hole 40 therein. This tongue 39 is adapted to be received within a slot 41 of the lever 29. The lever 29 has holes 42 which will align with the hole 40 when the tongue 39 is received within the slot 41 so that a pin 44 can be passed through holes 42 and the hole 40 to hold the assembly together.

It should now be understood that the distance from the holes 42 to the end 45 of the lever 29 is such that the stud 35 is allowed to move under the influence of the spring 36 to separate the sections 25a and 25b of the disk 25. The spring 36 will hold the sections sufficiently separated that the inner circumference of the aperture 26 will not engage the sleeve 18. However, it should be understood that the distance from the holes 42 to the side of the lever 29 is a greater distance so that, when the lever 29 is pivoted about the pin 44 so that the side 46 engages the ear 31, the stud 35 will be moved towards the lever 29, thereby compressing the spring 36 and constricting the disk 25 by bringing the sections 25a and 25b towards each other to reduce the size of the aperture 26 so that the inner periphery of the aperture 26 engages the sleeve 18.

From the foregoing discussion, it should be now understood that, in order to use the cruise control device 10 of the present invention, one would first remove the hand grip 12, then slide the device 10 onto the sleeve 18 until the disk 25 substantially engages the housing 14 and the anchoring means, or the tab 21, extends between the fittings 19 and 20. At this point, the hand grip 12 would be replaced over the rotatable sleeve 18 until the hand grip 12 is substantially contiguous with the disk 12. Because the tab 21 extends between the fittings 19 and 20, it will be understood that the disk 25 cannot rotate with respect to the handlebar 11 or the housing 14. As a result, if the periphery of the aperture 26 engages the sleeve 18 tightly, the sleeve 18 will not rotate with respect to the handlebar 11 whereas if the aperture 26 is loose around the sleeve 18, the sleeve 18 can rotate freely with no interference from the cruise control device 10.

Thus, when one is riding the motorcycle or vehicle under normal conditions, the cruise control device 10 would in no way change, or interfere with, the conventional operation of the spring-return throttle.

Considering the situation wherein a person would wish to use the cruise control device of the present invention, one would ride the vehicle as usual, and would not operate the vehicle in any different manner until he attained a desired speed and wished to maintain that speed for an extended period of time. At this point, the operator of the vehicle would hold his grip on his hand grip 12 while extending a finger to raise the lever 29, causing the lever 29 to rotate about the pin 44. This action will cause the stud 35 to be moved through the ears 30 and 31, compressing the spring 36 and drawing the sections 25a and 25b of the disk towards each other to constrict the aperture 26 and cause the inner periphery of the aperture 26 to engage the rotatable sleeve 18. When the lever 29 is in its new position wherein the surface 46 engages the ear 31, the stud 35 will be held in its moved position with the spring 36 compressed and the sections of the disk 25 tightly engaging the sleeve 18. In this condition, the disk 25 cannot rotate with respect to the handlebar 11 due to the engagement of the tab 21 between the fittings 19 and 20, and the sleeve 18 cannot rotate with respect to the disk 25 because of the frictional engagement of the inner periphery of the aperture 26 with the sleeve 18. As a result, the rotatable sleeve 18 will be held in its predetermined position.

Since the disk 25 is relatively thin, it will be understood that the surface of the disk 25 engaging the rotatable sleeve 18 is rather small so that the holding force can be overcome by the operator of the vehicle. As a result, if the operator wishes to advance the throttle slightly, he can do so without releasing the cruise control device 10 by merely rotating the hand grip 12 as he would normally do to advance the throttle, thereby overcoming the frictional force holding the rotatable sleeve 18 in its fixed position. Likewise, if the operator wishes to decrease the throttle somewhat, he can rotate the hand grip 12 in the opposite direction, again overcoming the holding force of the cruise control device 10.

When the operator of the vehicle wishes to release the cruise control device 10 so that it will no longer be effective, he can simply extend a finger and urge the lever 29 down, causing the lever 29 to rotate about the pin 44 to the position as shown in the drawing. By this motion, the stud 35 will move through the ears 30 and 31 of the disk 25, the spring 36 will expand and move the ears 30 and 31 apart thereby urging the sections 25a and 25b of the disk 25 apart to expand the size of the aperture 26 and release the grip on the rotatable sleeve 18.

It will therefore be seen that the cruise control device of the present invention provides a very simple and efficient means by which the rotatable sleeve for advancing the throttle on a vehicle can be rotated to a predetermined position, and held in that position. The device of the present invention is especially desirable in that, even though the device is engaged, the operator of the vehicle can override the cruise control device to increase the throttle and decrease the throttle at any given time. In addition, the cruise control device of the present invention is very easily released so that device can be used or not used at the whim of the operator.

While the foregoing has been described for use with a vehicle having the two fittings 19 and 20, FIG. 5 of the drawing shows a slightly modified form of the invention wherein only one such fitting is provided on a vehicle. In this instance, the tab, here designated as tab 21a, is bifurcated so that the fitting shown in phantom as 19a is received between the bifurcations of the tab 21a. Those skilled in the art will understand that the operation of the cruise control device is otherwise the same, the anchoring means for preventing rotation being somewhat modified to allow use of the device with a different style of vehicle.

It will of course be understood by those skilled in the art that the embodiments of the invention here presented are by way of illustration only, and are meant to be in no way restrictive; therefore, numerous changes and modifications may be made and the full use of equivalents resorted to without departing from the spirit or scope of the invention as defined by the appended claims.

I claim:

1. A throttle control device, for a throttle apparatus including a handlebar and throttle operating means mounted on said handlebar, said throttle operating means including a sleeve rotatably mounted on said handlebar, said sleeve being adapted for receiving a handgrip thereover, and a housing fixed to said handlebar adjacent to said sleeve, said control device comprising clamping means for selectively holding said throttle operating means in a predetermined position, characterized in that said clamping means includes a disk defining an aperture for receiving said sleeve, said disk being positionable between said handgrip and said housing with said handgrip substantially contiguous to said disk, anchoring means for preventing rotation of said disk with respect to said housing including a tab fixed to said disk and engageable with said housing, said disk including a plurality of sections, means for urging said plurality of sections away from one another to enlarge said aperture and allow free rotation of said sleeve with respect to said disk, and constricting means for urging said plurality of sections towards one another to constrict said aperture and restrict rotation of said sleeve.

2. A throttle control device as claimed in claim 1, and wherein said housing includes at least one fitting extending therefrom, characterized in that said tab is engageable with said at least one fitting for preventing rotation of said disk.

3. A throttle control device as claimed in claim 2, said tab being bifurcated, said at least one fitting being receivable between the bifurcations.

4. A throttle control device as claimed in claim 2, said constricting means including a pair of ears, each ear of said pair of ears being fixed to one section of said plurality of sections, and cam means for selectively urging said pair of ears towards each other.

5. A throttle control device as claimed in claim 4, and further including a spring between said ears for urging said ears away from each other, a stud extending through said ears, said cam means being carried on one end of said stud, and a lever for operating said cam.

6. A throttle control device as claimed in claim 5, said at least one fitting comprising a pair of fittings spaced apart, said tab being receivable between said pair of fittings.

* * * * *